United States Patent [19]

Login et al.

[11] Patent Number: 5,214,089
[45] Date of Patent: May 25, 1993

[54] STABILIZED AQUEOUS SOLUTION OF A $C_1$-$C_5$ ALKYL VINYL ETHER AND MALEIC ACID COPOLYMER

[75] Inventors: Robert B. Login, Oakland; Krystyna Plochocka, Scotch Plains; Jui-Chang Chuang, Wayne, all of N.J.

[73] Assignee: ISP Investments Inc., Wilmington, Del.

[21] Appl. No.: 761,535

[22] Filed: Sep. 18, 1991

[51] Int. Cl.$^5$ .......................... C08K 3/30; C08F 22/04
[52] U.S. Cl. .................................... 524/418; 524/419; 524/421; 524/556; 524/549; 526/271; 526/318.2
[58] Field of Search ............... 524/556, 418, 419, 421; 526/271, 318.2

[56] References Cited

U.S. PATENT DOCUMENTS

| | | | |
|---|---|---|---|
| 4,396,734 | 8/1983 | Williams et al. | 524/556 |
| 4,581,405 | 4/1986 | Martischius et al. | 524/418 |
| 4,863,989 | 9/1989 | Obayashi et al. | 524/418 |

FOREIGN PATENT DOCUMENTS 0295730 12/1988 European Pat. Off. ............ 524/421

*Primary Examiner*—Paul R. Michl
*Assistant Examiner*—LaVonda R. DeWitt
*Attorney, Agent, or Firm*—Walter Katz; Marilyn J. Maue; Joshua J. Ward

[57] ABSTRACT

What is provided herein is a stabilized aqueous solution of a $C_1$-$C_5$ alkyl vinyl ether and maleic acid copolymer which includes about 10-500 ppm of an inorganic reducing agent as a stabilizing additive, said reducing agent being effective to prevent oxygen from the air and peroxides contained in polymer system from degrading the copolymer. Preferably the reducing agent is sulfur dioxide and salts derived from sulfur dioxide and alkali metals such as, sodium or potassium bisulfite, sodium or potassium metabisulfite, sodium or potassium thiosulfite, or sodium or potassium sulfite.

8 Claims, No Drawings

STABILIZED AQUEOUS SOLUTION OF A $C_1$-$C_5$ ALKYL VINYL ETHER AND MALEIC ACID COPOLYMER

BACKGROUND OF THE INVENTION

1. Field of the Invention

This invention relates to copolymers of $C_1$-$C_5$ alkyl vinyl ethers and maleic acid, and, more particularly, to stabilized aqueous solutions of such copolymers.

2. Description of the Prior Art

The copolymerization of maleic anhydride and a $C_1$-$C_5$ alkyl vinyl ether yields a copolymer which is more properly characterized as an interpolymer wherein both ethylenically unsaturated moieties enter into the formation of the same polymer chain. It has been indicated by infra-red spectroscopy and chemical examination and analyses that alkyl vinyl ethers and maleic anhydride interpolymerize in the molar ratio of about 1:1, the polymer chain thereof containing alternating anhydride units and alkyl vinyl ether units. The resulting interpolymers are, in general, soluble in aqueous systems upon prolonged contact with water, presumably due to the hydrolysis of the anhydride groups to acid groups, and are known to be useful in personal care produces and other applications. In the aqueous environment, however, it has been found that the interpolymers undergo substantial and serious decomposition, which is manifested by a decrease in the viscosity of solutions prepared from the interpolymer materials. As it is often necessary to prepare specific interpolymers of specified viscosity grade, it is often found that, after suitable processing of the interpolymer, the expected viscosity specifications of the solutions are not met. It has further been ascertained that elevated temperatures cause a more rapid decline in the viscosity grade of the material. Since it is essential in commercial practice to obtain such interpolymers at definite specifications of viscosity, it has become necessary to effect a stabilization of the interpolymers whereby the viscosity of the material will remain substantially unchanged under conditions which normally lead to decomposition and consequent lowering of the viscosity.

In the art, various procedures have been attempted in order to obtain aqueous solutions of the interpolymers which will retain constant viscosities during extended periods of storage. These prior art methods, however, have not been entirely successful as in each instance the viscosity has been found to decrease over substantial periods of storage. These methods have generally involved the addition to the aqueous solutions of the interpolymer of various materials in an effort to effect the desired stabilization of the interpolymers. It has been suggested, for example, that certain thioamides may be employed to stabilize aqueous solutions of the interpolymer. However, these materials have been found useful only for short periods as the stabilizing characteristics become very poor over extended periods. Similarly, the use of ethylene-diaminetetraacetic acid has been suggested as a stabilizing agent. As with the thioamides, however, this material has not accomplished the purpose. Therefore, as pointed out, none of these prior materials have proven successful in providing aqueous solutions of interpolymers or copolymers of maleic acid or anhydride with alkyl vinyl ethers to enable use of the solutions for commercial specifications over periods of extended storage.

Kervenski, in U.S. Pat. No. 3,531,427, for example, described a stabilizer mixture of ethylenediaminetetraacetic acid and a secondary additive. However, these stabilizer mixtures were not entirely satisfactory because many of the secondary additives listed were not effective in stabilizing the viscosity of the interpolymer; had to be used in very large amounts; were very toxic even in low concentrations; and discolored the solution.

Accordingly, it is an object on this invention to provide colorless, stabilized aqueous solutions of a copolymer of a $C_1$-$C_5$ alkyl vinyl ether and maleic acid which is suitable for industrial applications, and which is effective for stabilizing the copolymer even when used at low concentrations.

Another object of the invention is to provide a process of preparing such colorless, stabilized aqueous solutions having higher viscosities than available previously and which will retain their initial viscosity levels over extended periods of time.

These and other objects and features of the invention will be made apparent as the description thereof proceeds.

SUMMARY OF THE INVENTION

What is provided herein is a colorless, stabilized aqueous solution of a $C_1$-$C_5$ alkyl vinyl ether and maleic acid which includes about 10 to 500 ppm of stabilized additive of an inorganic reducing agent, such as sulfur dioxide, and salts derived from sulfur dioxide and alkali metals such as sodium or potassium bisulfite, sodium or potassium metasulfite, sodium or potassium sulfite or sodium or potassium thiosulfite, said reducing agent being effective to prevent oxygen from the air or peroxides contained in the polymer system from degrading the copolymer, said stabilized solution exhibiting an increase in specific viscosity and a substantially constant Brookfield viscosity, after 2 months as compared to an untreated copolymer. Preferably, the acid solution is prepared by hydrolyzing the corresponding anhydride in the presence of said additive.

DETAILED DESCRIPTION OF THE INVENTION

According to this invention, copolymers of maleic anhydride and a $C_1$-$C_5$ alkyl vinyl ether, e.g. methyl vinyl ether, are dissolved in water containing about 10–500 ppm of a stabilizer additive which is an inorganic reducing agent such as sulfur dioxide, sodium or potassium bisulfite, sodium or potassium metabisulfite, sodium or potassium sulfite or sodium or potassium thiosulfite. The copolymer reaction solution containing the predetermined amount of the reducing additive then is hydrolyzed to the corresponding acid form of the copolymer to provide the desired colorless, stabilized aqueous solution of maleic acid-$C_1$-$C_5$ alkyl vinyl ether copolymer which includes the reducing additive. The resultant copolymer solution contained about 11–13% solids therein.

While the additive could be added after hydrolysis, it is much preferred to add it directly to the anhydride copolymer before hydrolysis. The relative viscosity of the copolymer solution of Gantrez ® AN-169 (methyl vinyl ether/maleic anhydride copolymer) from International Specialty Products Inc. thus obtained is much improved as compared to either the untreated copolymer or the treated copolymer after hydrolysis. The specific viscosity of the resultant copolymer solutions is about 8-13, as determined in water at a concentration of 1% at 25° C.

The invention will now be described with reference to the following examples.

COMPARATIVE EXAMPLES 1. Untreated Copolymer

A 1-liter resin kettle equipped with an agitator, a reflux condenser and a water bath was charged with 22.0 g. of methyl vinyl ether/maleic anhydride copolymer (Gantrez ® AN-169, International Specially Products Inc.) of specific viscosity of 2.6 (as determined in methyl ethyl ketone at a concentration of 1% at 25° C.) and 178.0 g. of deionized water. While agitating, the mixture was heated to 85° C. and maintained at this temperature for 1.5 hours. During this period the anhydride groups of the copolymer were converted to carboxylic acid groups generating a methyl vinyl ether/maleic acid copolymer. The clear solution which contained 12.4% solids was cooled to room temperature and maintained, in the dark, for 2 months. The stability of the solution was determined by measuring its specific viscosity (1% in $H_2O$, at 25° C.) and Brookfield viscosity (Spindle #3, 5 rpm, 25° C.). The results were the following:

TABLE 1

| Time, months | Spec. Viscosity | Brookfield Viscosity, cps |
|---|---|---|
| 0 | 8.21 | 1250 |
| 2 | 2.02 | 360 |

The data shows that a solution of methyl vinyl ether/maleic acid copolymer, which did not contain any stabilizer, deteriorated to about 24% of its initial specific viscosity, and to about 29% of its initial Brookfield viscosity, after a period of 2 months.

INVENTION EXAMPLES 1. Additive After Hydrolysis

To the solution of Example 1 various stabilizers were added. The stabilizing effect is apparent in the data in Table 2 below.

TABLE 2

| Additive/ppm | Time, months | Spec. Viscosity | Brookfield Viscosity, cps |
|---|---|---|---|
| None | 0 | 8.21 | 1250 |
|  | 2 | 2.02 | 360 |
| $NaHSO_3/100$ | 0 | 8.21 | 1250 |
|  | 2 | 7.14 | 1120 |

The data shows an improvement over the untreated copolymer of Example 1 Specifically, the specific viscosity of the copolymer decreased by only 13% and the Brookfield viscosity of the copolymer solution decreased by only about 10% after standing for 2 months at room temperature.

2. Additive Before Hydrolysis

A copolymer solution as in Example 1 was prepared by dissolving Gantrez ®AN-169 in an inorganic reducing additive and water prior to beginning of heating. The acid copolymer was made by heating as in Example I. The results are shown in Table 3 below.

TABLE 3

| Additive | Time, months | Spec. Viscosity | Brookfield Viscosity, cps |
|---|---|---|---|
| $NaHSO_3/50$ | 0 | 10.16 | 2380 |
|  | 2 | 9.68 | 2050 |
| $NaHSO_3/100$ | 0 | 12.28 | 2920 |
|  | 2 | 10.37 | 2480 |

The data above demonstrates the advantage of adding the reducing additive during dissolution of copolymer. Accordingly, both the specific viscosity and the Brookfield viscosity values of the solution were at least 85% of its initial values after 2 months, and with much higher initial and final viscosities than when the same additive was used after hydrolysis.

While the invention has been described with particular reference to $C_1$-$C_5$ alkyl vinyl ether-maleic acid copolymers, it will be understood that related copolymers and terpolymers, and crosslinked products thereof, may be used as well.

What is claimed is:

1. A colorless, stabilized, aqueous solution of a copolymer of a $C_1$-$C_5$ alkyl vinyl ether and maleic acid formed by hydrolysis of a $C_1$-$C_5$ alkyl vinyl ether and maleic anhydride, which remains substantially constant in viscosity after standing at room temperature, upon inclusion therein of, about 10 to 500 ppm of an inorganic reducing additive which consists essentially of sulfur dioxide, a salt derived from sulfur dioxide, and an alkali metal selected from sodium or potassium bisulfite, sodium or potassium metabisulfite, sodium or potassium thiosulfite, or sodium or potassium sulfite.

2. A solution according to claim 1 which is prepared by hydrolyzing a copolymer of a $C_1$-$C_5$ alkyl vinyl ether and maleic anhydride in the presence of said additive.

3. A solution according to claim 2 which includes about 50-100 ppm of said additive.

4. A solution according to claim 1 which includes about 11-13% by weight of said copolymer.

5. A solution according to claim 1 which has a specific viscosity of about 8-14.

6. A solution according to claim 1 wherein said additive is sodium bisulfite.

7. A solution according to claim 1 wherein said additive is sodium metabisulfite.

8. A solution according to claim 1 wherein said additive is sodium sulfite.

* * * * *